(12) United States Patent
Oishi et al.

(10) Patent No.: US 6,576,058 B2
(45) Date of Patent: Jun. 10, 2003

(54) OPTICAL FIBER COATING METHOD AND COATING APPARATUS

(75) Inventors: Kazumasa Oishi, Yokohama (JP); Kaoru Okuno, Yokohama (JP); Ichiro Tsuchiya, Yokohama (JP); Masahiro Takagi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/447,886

(22) Filed: Nov. 24, 1999

(65) Prior Publication Data

US 2002/0179008 A1 Dec. 5, 2002

Related U.S. Application Data

(63) Continuation-in-part of application No. PCT/JP98/04738, filed on Oct. 20, 1998.

(30) Foreign Application Priority Data

Dec. 22, 1997 (JP) .............................................. 9-353150
Nov. 26, 1998 (JP) ........................................... 10-335794

(51) Int. Cl.⁷ ................................................. B05C 3/12
(52) U.S. Cl. ...................... 118/420; 118/125; 118/411
(58) Field of Search ........................ 65/529, 432, 492, 65/374.13; 118/420, 125, 411

(56) References Cited

U.S. PATENT DOCUMENTS

| 4,474,830 A | 10/1984 | Taylor | 427/54.1 |
| 4,480,898 A | 11/1984 | Taylor | 350/96.3 |
| 4,510,884 A * | 4/1985 | Rosebrooks | 118/405 |
| 4,688,515 A * | 8/1987 | Rosebrooks | 118/405 |
| 5,449,408 A * | 9/1995 | Koaizawa et al. | 118/405 |

FOREIGN PATENT DOCUMENTS

| JP | 2-38437 | 3/1990 |
| JP | 9-86971 | 3/1997 |
| JP | 09-241042 | 9/1997 |
| JP | 09-255372 | 9/1997 |

* cited by examiner

Primary Examiner—Brenda A. Lamb
(74) Attorney, Agent, or Firm—McDermott, Will & Emery

(57) ABSTRACT

In an optical fiber coating method comprising the steps of; applying an injecting first coating resin to the outer periphery of the optical fiber while inserting the optical fiber through a first die hole provided in a first coating die; and applying an injected second coating resin onto the first coating resin while inserting the optical fiber through a second die hole provided in a second coating die. Wherein a disk-shaped upper end face of the second coating die and a basically disk-shaped lower end face of the first coating die having a protrusion formed around the first die hole and projecting in the passing direction of the optical fiber are opposed to each other so as to arrange the first and second die holes concentrically, and the second coating resin is injected into the second die hole by way of a gap formed between the lower end face of the first coating die and the upper end face of the second coating die, so as to reduce an annular lower-pressure region formed around the optical fiber in a flow of the second coating resin within the gap.

6 Claims, 15 Drawing Sheets

OPTICAL FIBER COATING METHOD AND COATING APPARATUS

RELATED APPLICATION

This is a continuation-in-part application of application serial no. PCT/JP98/04738 filed on Oct. 20, 1998, now pending.

BACKGROUND OF THE INVENTION

1. Field of the Invention

The present invention relates to an optical fiber coating method and coating apparatus; and, in particular, to those adapted to stably apply a coating resin in a higher linear velocity region.

2. Related Background Art

In the making of optical fibers, there has conventionally been employed a method comprising the steps of drawing an optical fiber by pulling an optical fiber preform while heating and melting it; applying two different types of resins to the surface thereof by use of a die adapted to apply two layers at the same time; curing the resins by use of a curing apparatus; and taking up the optical fiber with a take-up apparatus by way of a capstan, a pulley, and the like. An apparatus which applies two different types of resins by use of a die adapted to apply two layers at the same time is disclosed in Japanese Utility Model Application Laid-Open No. HEI 2-38437, Japanese Patent Application Laid-Open No. HEI 9-86971, or the like.

FIG. 16 is a sectional view of the conventional optical fiber coating apparatus disclosed in Japanese Patent Application Laid-Open No. HEI 9-86971. An optical fiber 1 comes into contact with a first coating resin A when passed through a die hole 30 of a first coating die 3 from a nipple hole 20. The optical fiber 1 covered with the first coating resin A further comes into contact with a second coating resin B when passed through a die hole 40 of a second coating die 4 from the die hole 30, and then is drawn out of the die hole 40, whereby the optical fiber 1 with a double coating is fabricated.

From a first coating resin introduction hole 71 provided in the upper part of an outer sleeve 7, the first coating resin A is successively supplied to an outer peripheral groove 65 of an inner upper sleeve 6a, a hole thereof, a first reservoir 11 disposed at the outer periphery of the nipple 2, a first draw portion 9, a first coating resin orthogonal flow path 10 formed by the tip surface of the nipple 2 and the upper face of the first coating die 3, and a portion between the outlet of the nipple hole 20 and the inlet of the die hole 30. From a second coating resin introduction hole 72 provided in the lower part of the outer sleeve 7, the second coating resin B is successively supplied to an outer peripheral groove 66 of an inner lower sleeve 6b, a hole thereof, a second reservoir 12 disposed at the outer periphery of the second coating die 4, a second draw portion 13, a second coating resin orthogonal flow path 14 formed by the lower face of the first coating die 3 and the upper face of the second coating die 4, and a portion between the outlet of the die hole 30 and the inlet of the die hole 40.

It is described that the first coating resin 11 is thus once stored in the first reservoir 11 and then is sufficiently narrowed by the first draw portion 9, thereby being regulated so as to form a uniform flow throughout the periphery, by which the optical fiber 1 is provided with a coating having a uniform thickness. On the other hand, the first coating resin orthogonal path 10 is formed between the outlet end face of the nipple hole 20 and the inlet end face of the die hole 30 and intersects the optical fiber 1 at right angles. It is also described that the first coating resin A consequently flows orthogonal to the optical fiber 1, and thus can stably be applied to the latter while suppressing the recirculation thereof.

SUMMARY OF THE INVENTION

However, such a conventional coating apparatus has a drawback in that the outside diameter of the coating fluctuates as the drawing speed increases.

The inventors studied causes of the outside diameter fluctuation in detail by simulations and experiments. As a result, it has been found that, if the outlet portion of the die hole 30 at the lower face of the first coating die 3 is flat, then an unstable annular lower-pressure region is formed near this outlet, whereby the first coating resin A applied to the outer periphery of the optical fiber 1 is pulled by the annular lower-pressure region, so as to irregularly expand to the outside, thus forming the outside diameter fluctuation in the coating.

For eliminating the outside diameter fluctuation of the coating, the inventors have found it effective to provide a protrusion for regulating flows near the outlet. The present invention is based on this finding.

Here, the results of CFD (Computational Fluid Dynamics) simulations will be explained in brief.

Flow analysis program CFX 4.1 (Flow Solver) manufactured by AEA Technology PLC was used for the simulations, and influences of the form of the outlet portion were mainly studied. The analysis condition is shown in the following Table.

| | |
|---|---|
| Taper angle of $1^{st}$ layer die | 3 degrees |
| $1^{st}$ layer die hole diameter | 0.25 mm |
| Distance between $1^{st}$ and $2^{nd}$ layer dies | 1.0 mm (parallel part) |
| $2^{nd}$ layer die hole diameter | 0.38 mm |
| Resin viscosity | 1000 cps in both $1^{st}$ and $2^{nd}$ layers |
| Resin feed pressure | 2.5 kg/mm$^2$ in both $1^{st}$ and $2^{nd}$ layers |
| Fiber linear velocity | 1000 m/min |

Under this analysis condition, two kinds of cases, i.e., case 1 in which the first layer die hole outlet is flat (corresponding to the conventional coating apparatus) and case 2 in which the first layer die hole outlet is provided with a beak-shaped protrusion having a height of 0.1 mm and a skirt width of 0.1 mm (corresponding to the coating apparatus of the present invention), were analyzed. FIGS. 1 and 3 show the respective pressure distributions near the first layer die hole outlet of the two cases, whereas FIGS. 2 and 4 show the respective stream line vector distributions near the first layer die hole of the two cases.

In case 1 corresponding to the conventional coating apparatus, as shown in FIG. 1, it can be seen that an annular lower-pressure region widely spreads near the first layer die hole outlet. Consequently, the resin coming out of the first layer die hole is outwardly pulled in the vicinity of the outlet as shown in FIG. 2. As a result, a bulge occurs in the outside diameter of the coating.

In case 2 corresponding to the coating apparatus of the present invention, on the other hand, as shown in FIG. 3, it can be seen that the annular lower-pressure region becomes smaller. Consequently, resin flows substantially align in parallel with the optical fiber drawing direction as shown in FIG. 4, whereby the outside diameter of the coating becomes more stable than that in case 1.

The inventors also studied influences of the form of the protrusion provided near the outlet by CFD simulations. FIGS. 5A to 5D show their results, and are views schematically showing lower-pressure regions generated near the outlet of the first die hole 30 and their resulting outside diameter fluctuations. In the case shown in FIG. 5A provided with no protruded member, a lower-pressure region 15 of second coating resin B near the optical fiber 1 spreads over a wide area, whereby a bulge 11 of first coating resin A becomes remarkable. In the case with a protrusion shaped like a circular truncated cone as shown in FIG. 5B, on the other hand, it has been found that the lower-pressure region 15 near the optical fiber 1 is suppressed, so as to substantially eliminate the bulge 11 of first coating resin A. It has also been found that, in the case where the protruded member is substantially conical or shaped like a flat circular truncated cone with a large head or bottom portion as shown in FIG. 5C or 5D, the effect on reducing the dimensions of the lower-pressure region 15 tends to be smaller.

Also, the inventors compared these CFD simulation results with experimental results, and have confirmed the effect on suppressing the outside diameter fluctuation obtained when the protrusion is shaped like a circular truncated cone with a small head portion.

The present invention is based on these findings, and it is an object of the present invention to provide an optical fiber coating method and coating apparatus which, when the optical fiber is covered with a resin applied thereto, can improve the applicability of the resin to the optical fiber, and by which the coating resin can stably be applied to the optical fiber without outside diameter fluctuation, in particular, in a higher linear velocity region of the optical fiber.

The optical fiber coating method in accordance with the present invention comprises the steps of: (1) applying a first coating resin to the outer periphery of an optical fiber by injecting a first coating resin into a clearance between a first die hole and the optical fiber, while inserting the optical fiber through the first die hole provided in a first coating die and having an inside diameter greater than an outside diameter of the optical fiber; and (2) applying a second coating resin onto the first coating resin by injecting a second coating resin into a clearance between a second die hole and the surface of the first coating resin applied to the optical fiber, while inserting the optical fiber through the second die hole provided in the second coating die and having an inside diameter greater than that of the first die hole. Wherein a disk-shaped upper end face of the second coating die and a basically disk-shaped lower end face of the first coating die having a protrusion formed around the first die hole and projecting in the passing direction of the optical fiber are opposed to each other so as to arrange the first and second die holes concentrically, and the second coating resin is injected into the second die hole by way of a gap formed between the lower end face of the first coating die and the upper end face of the second coating die, so as to reduce an annular lower-pressure region formed around the optical fiber in a flow of the second coating resin within the gap.

And the optical fiber coating apparatus in accordance with the present invention is an optical fiber coating apparatus for applying first and second coating resins as a laminate to the outer periphery of an optical fiber, the apparatus comprising a first coating die and a second coating die; the first coating die having a first die hole through which the optical fiber is inserted and a basically disk-shaped lower end face with a protrusion projecting in the passing direction of the optical fiber and formed around the first die hole, the first die hole and the outer periphery of the optical fiber therein forming a space therebetween into which the first coating resin is injected; the second coating die having a second die hole which is concentric with the first die hole and through which the optical fiber passed through the first die hole is inserted and an upper end face comprising a circular plate opposing the lower end face of the first coating die so as to form a gap through which the second coating resin is injected into a space formed between the second die hole and the outer periphery of the optical fiber therein. The protrusion being formed so as to reduce an annular lower-pressure region formed around the optical fiber in a flow of the second coating resin within the gap.

According to the present invention, the first coating resin is applied to the outer periphery of the optical fiber through the first die hole of the first coating die. Also, the second coating resin is supplied from the surroundings of the gap formed by the first and second coating dies into the second die hole at the center part, so as to be applied onto the first coating resin. Here, since the first die hole outlet is formed to have a protrusion which is shaped so as to project toward the exit, i.e., toward the second die hole, and reduce an annular lower-pressure region within the second coating resin which flows as mentioned above, the flow of second coating resin is regulated so as to align with the flowing direction of the optical fiber. As a consequence, the inserted optical fiber is restrained from vibrating, whereby the first and second coating resins can uniformly be applied to the optical fiber at the first and second die holes, respectively. Also, since the tip of the protrusion approaches the inlet of the second die hole, it is effective in the prevention of vibration.

As a result of the above-mentioned studies, the inventors have found it preferable for the protrusion to be shaped like a circular truncated cone and, in particular, to satisfy the following relationships:

$$0.05G < H < 0.5G$$

$$(D_2 - D_1)/2 < W < G$$

$$0.01 \text{ mm} \leq L < W$$

where H is the height of the circular truncated cone of the protrusion, W is the distance between the outer periphery of the bottom portion of the circular truncated cone and the inner peripheral face of the first die hole, L is the distance between the outer periphery of the head portion of the circular truncated cone and the inner peripheral face of the first die hole, $D_1$ is the inner peripheral face diameter of the first die hole on the outlet side of the optical fiber, $D_2$ is the inner peripheral face diameter of the second die hole on the inlet side of the optical fiber, and G is the distance of the gap between the first and second coating dies.

Preferably, the optical fiber coating apparatus in accordance with the present invention further comprises a positioning member having a cylindrical inner peripheral face adapted to fit the respective outer peripheral faces of the first and second coating dies, each of the first and second coating dies and the inner peripheral face of the positioning member being constituted by a material having a Young's modulus of $5 \times 10^4$ kg/mm$^2$ or greater and a coefficient of thermal expansion of $6 \times 10^{-6}$/° C. or lower.

In this configuration, the inner peripheral face of the positioning member and each of the coating dies fitted therein are constituted by a material having a high hardness suitable for precision processing. Therefore, when the first and second coating dies are fitted into the positioning member, the fitting clearance between the positioning member and each coating die can be made smaller. As a consequence, the alignment between the center axis of the hole of the first coating die and the center axis of the hole of the second coating die can easily be carried out with a high accuracy. Further, since the coating dies and at least the inner peripheral face of the positioning member are constituted by a material having a lower coefficient of thermal expansion, deformations due to thermal expansion can be suppressed even if the temperature of members rises while the resin is being applied to the optical fiber. Hence, the first coating die hole and the second coating die hole can be restrained from positionally shifting from each other, whereby a coating with less eccentricity can be applied to the optical fiber.

Preferably, this positioning member is constituted by an inner periphery member made of cemented carbide forming the inner peripheral face and an outer periphery member made of alloy tool steel having a lower Young's modulus and a higher coefficient of thermal expansion than the inner periphery member which are fastened and secured together by interference fitting.

If the whole positioning member is constituted by cemented carbide, then it becomes hard to process into a complicated form, though the fitting clearance between the positioning member and the coating dies can be made smaller. If the whole positioning member is constituted by alloy tool steel having a hardness lower than that of cemented carbide, on the other hand, then it becomes hard to maintain the accuracy of processing, though the member can easily be processed into a complicated form, whereby the fitting clearance increases so much that highly accurate alignment cannot be expected. When the positioning member has a double structure in which the inner periphery portion is made of cemented carbide, whereas the outer periphery portion is made of alloy tool steel, the fitting gap between the positioning member and each coating die can be kept smaller as mentioned above. As a consequence, the misalignment between the respective center axes of both die holes can be reduced. Further, since deformations of the coating apparatus upon thermal expansion are suppressed even if temperature rises, a coating with less eccentricity can be applied to the optical fiber. Also, since the outer side of the positioning member is constituted by alloy tool steel, this portion can easily be provided with a coating resin flow path having a complicated form and the like.

Preferably, the bottom face of the first or second die has a tap for use upon attachment/detachment with respect to the positioning member.

In the optical fiber coating apparatus in accordance with the present invention, the first and second coating dies are secured within the positioning member by fitting. When the bottom face of the first or second coating dies is provided with a tap, the attachment/detachment between the first or second coating die and the positioning member can be carried out easily and reliably for the cleaning of the inside of the coating apparatus and the like after coating. As a consequence, workability improves, and damages and deterioration in positioning accuracy can be prevented from occurring upon attachment/detachment.

Preferably, there is further provided a nipple made of a material having a Young's modulus, a coefficient of thermal expansion, and a hardness which are substantially identical to those of the inner peripheral face of the positioning member, the nipple being adapted to fit the inner peripheral face of the positioning member such that a nipple hole for guiding the inserted optical fiber to the first die hole is arranged concentric with the first die hole. When such a nipple is provided, the misalignment between the nipple hole and both die holes can be reduced, whereby a coating having a less eccentricity can be formed around the optical fiber.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 1 to 4 are views showing results of CFD simulations concerning coating outside diameter fluctuations of coating apparatus, in which FIG. 1 shows a pressure distribution of a coating resin concerning a conventional coating apparatus, FIG. 2 shows a stream line vector distribution thereof, FIG. 3 shows a pressure distribution of a coating resin concerning a coating apparatus of the present invention, and FIG. 4 shows a stream line vector distribution thereof;

FIG. 9 is a sectional view showing a configuration of an embodiment of the coating apparatus in accordance with the present invention, whereas

FIG. 11 is a sectional view of a positioning member 6 in the apparatus of FIG. 9, whereas

BEST MODES FOR CARRYING OUT THE INVENTION

Figure 1:
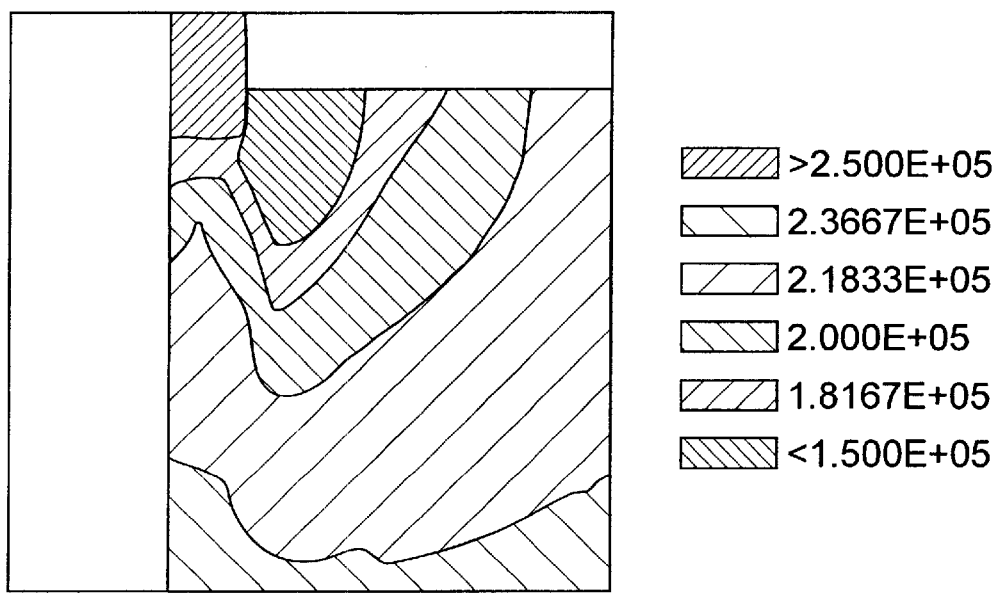
Figure 2:
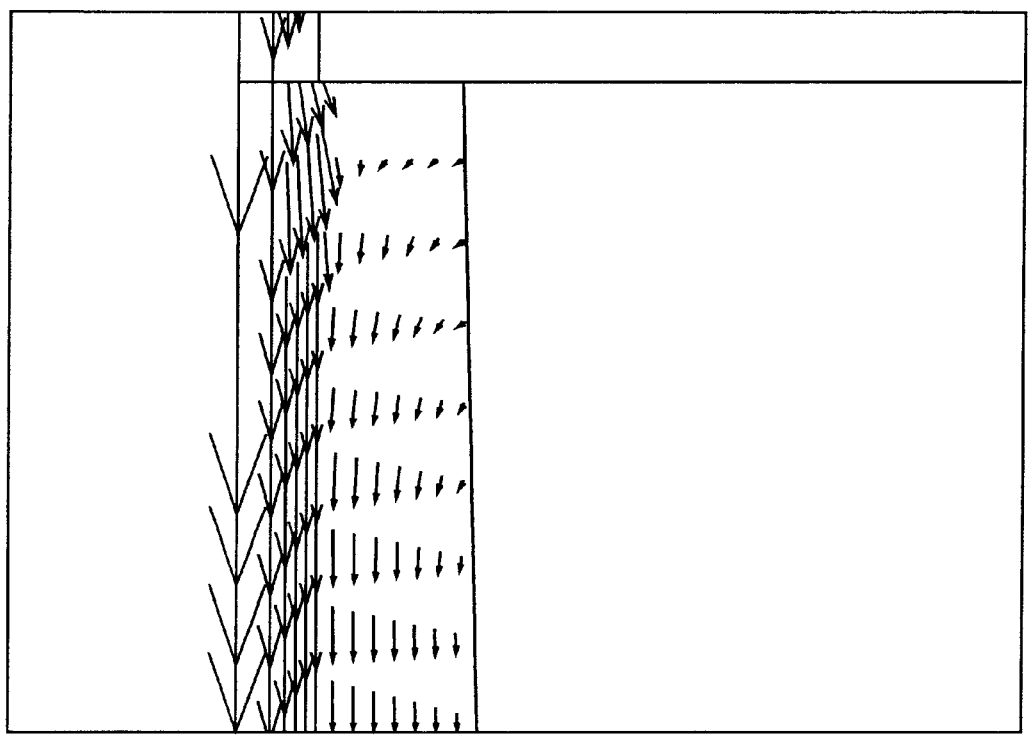

In the following, embodiments of the present invention will be explained in detail with reference to the accompanying drawings. To facilitate the comprehension of the explanation, the same reference numerals denote the same parts, where possible, throughout the drawings, and a repeated explanation will be omitted. Dimensions in the drawings include those exaggerated for the sake of explanation, so that ratios of dimensions of each constituent do not always coincide with those in practice.

Figure 6:
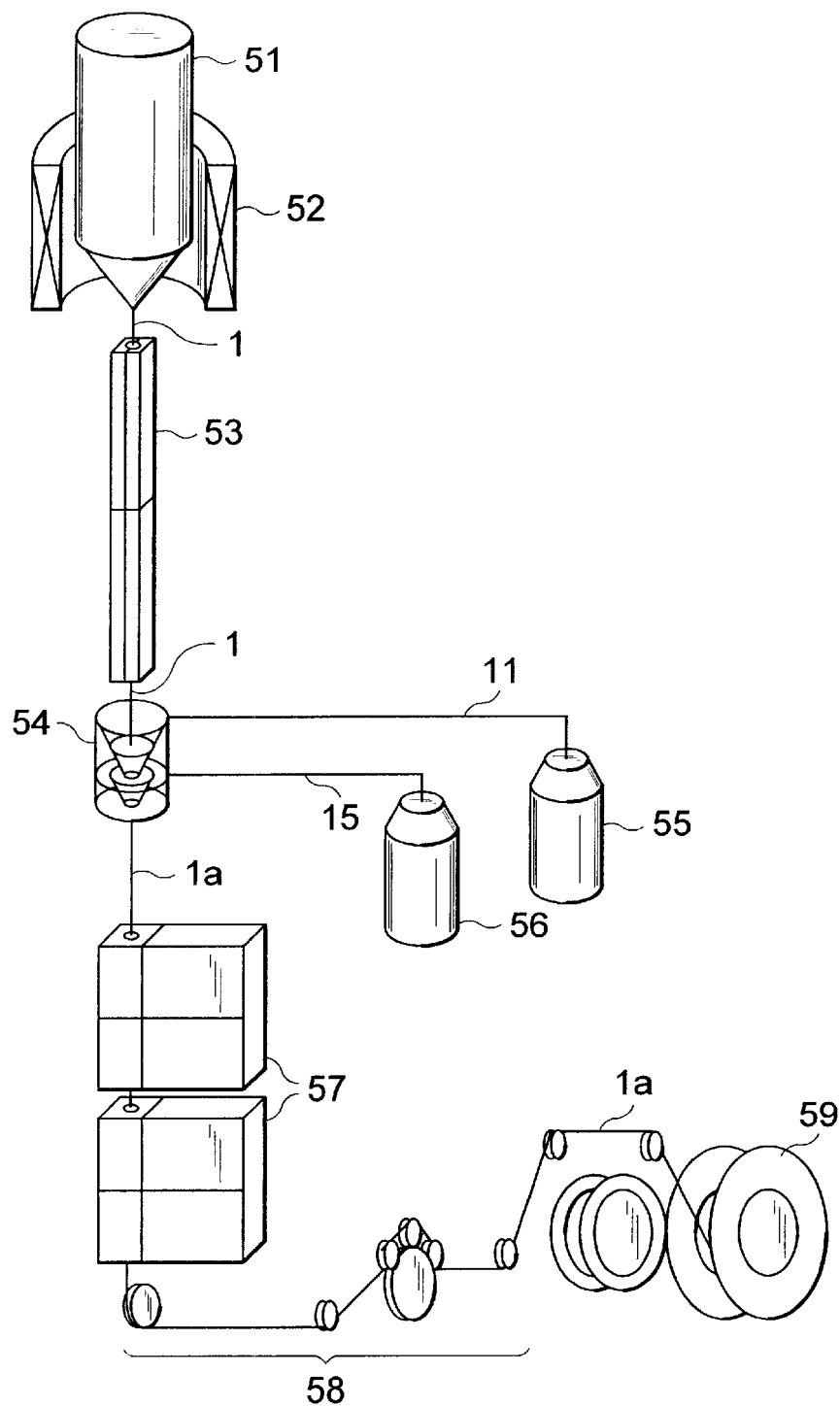
FIG. 6 is an overall configurational view of a coated optical fiber manufacturing line including the coating apparatus in accordance with the present invention.

Before explaining the coating method and apparatus in accordance with the present invention, the method of making a coated optical fiber and its manufacturing line as a whole will be explained in brief with reference to FIG. 6.

While a preform 51 is heated by a drawing furnace 52 so as to be softened, a tensile force is applied thereto, so that the preform 51 is thinly drawn and processed into a thin linear optical fiber 1. Thus processed optical fiber 1 is guided into a forced cooling apparatus 53, in which it is cooled and hardened. This optical fiber 1 is guided into a coating apparatus 54, in which first and second coating resins A, B supplied from coating resin tanks 55, 56 are applied as a double layer to the outer periphery of the optical fiber 1, whereby a coated optical fiber 1a is produced. The coated optical fiber 1a is guided into a UV-irradiation type curing apparatus 57, in which the applied coating resin is irradiated with ultraviolet rays so as to be cured. The coated optical fiber 1a having cured coating is fed to a take-up apparatus 59 with a capstan driving section 58, so as to be taken up by a prepared roll.

Figure 7:
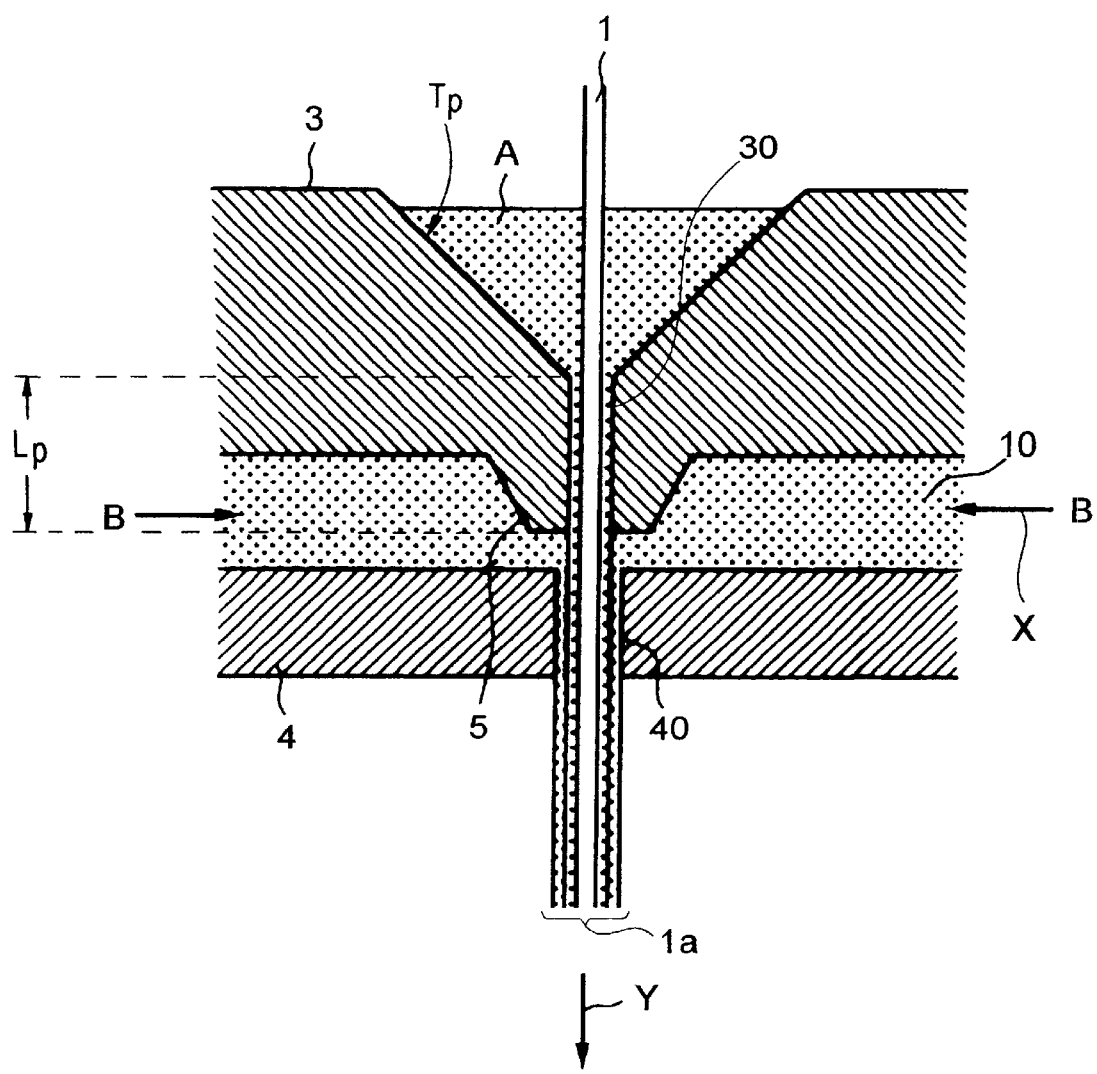
FIG. 7 is a sectional view showing a basic configuration of the coating apparatus in accordance with the present invention.

The coating method and coating apparatus in accordance with the present invention relate to the coating apparatus 54 for applying the coating resins. FIG. 7 is a sectional view showing a basic configuration of the coating apparatus in accordance with the present invention. In this apparatus, the first coating resin A and the second coating resin B are applied as a laminate to the outer periphery of the optical fiber 1, so as to produce the double-coated optical fiber 1a.

This apparatus comprises a first coating die 3 having a first die hole 30 through which the optical fiber 1 is inserted, and a second coating die 4 having a second die hole 40 disposed concentric with the first die hole 30 and downstream therefrom in the passing direction of the optical fiber 1. The inside diameter of the first die hole 30 is set greater than the outside diameter of the optical fiber 1, and the inside diameter of the second die hole 40 is set greater than the first die hole 30. On the outlet side of the optical fiber 1, the first die hole 30 is provided with a protrusion 5 projecting toward the second die hole 40, whereas a gap 10 for injecting the second coating resin B into the second die hole 40 is formed between the first coating die 3 and the second coating die 4. The first die hole 30 is constituted by a taper portion $T_p$ and a cylindrical land portion $L_p$, formed continuously therewith, having a smaller inside diameter.

Operations of this apparatus, i.e., basic operations of the coating method in accordance with the present invention, will now be explained.

The optical fiber 1 is drawn in the direction of arrow Y through the apparatus. Namely, the optical fiber 1 is initially inserted through the first die hole 30. Here, the first coating resin A, which is adjusted by heating or the like to yield a low viscosity (e.g., 1000 cps), has been injected into the space between the inner periphery of the first die hole 30 and the outer periphery of the optical fiber 1. Due to the friction with the outer peripheral face of the optical fiber 1 passing through the first die hole 30 at a high speed, the first coating resin A is pulled by the optical fiber 1, so as to raise the pressure within the resin, by which the resin is applied to the outer peripheral face of the optical fiber 1 substantially uniformly.

The optical fiber 1 thus having its outer peripheral face coated with the first coating resin A passes through the outlet of the first die hole 30 located at the tip of the protrusion 5, thereby being inserted into the second die hole 40. Here, the second coating resin B has been injected into the space between the inner periphery of the second die hole 40 and the surface of the first coating resin A applied onto the optical fiber 1 through the gap 10 in the direction of arrow X (i.e., toward the center of diameter). It is preferred that the second coating resin B be adjusted by heating or the like to have a low viscosity (e.g., 1000 cps) on the same order as that of the first coating resin A. It is because of the fact that, if the viscosity of the first coating resin A and that of the second coating resin B differ greatly from each other, then flows are likely to be disordered at the interface between the first coating resin A and the second coating resin B, whereby there is a possibility of the interface between both coated resins being disordered. Due to the friction with the outer surface of the first coating resin A applied onto the outer peripheral face of the optical fiber 1 passing through the second die hole 40 at a high speed, the second coating resin B supplied to the second die hole 40 is pulled by the first coating resin A, so as to raise the pressure within the second coating resin B, by which the second coating resin B is applied to the outer surface of the first coating resin A substantially uniformly. Since the outlet of the first die hole 30 is provided with the protrusion 5, the flow of second coating resin B within the gap 10 is regulated as mentioned above, whereby annular lower-pressure regions are restrained from occurring in the area surrounding the optical fiber 1. As a result, fluctuations are restrained from occurring in the interface between the first coating resin A and second coating resin B applied to the optical fiber 1 immediately after the latter comes out of the first die hole 30, whereby the outside diameter fluctuation of the applied first coating resin A can be suppressed.

Using the apparatus shown in FIG. 7, the inventors carried out experiments for confirming the flow-regulating effects upon the second coating resin obtained by the protrusion 5, results of which will be explained in the following.

Figure 8:
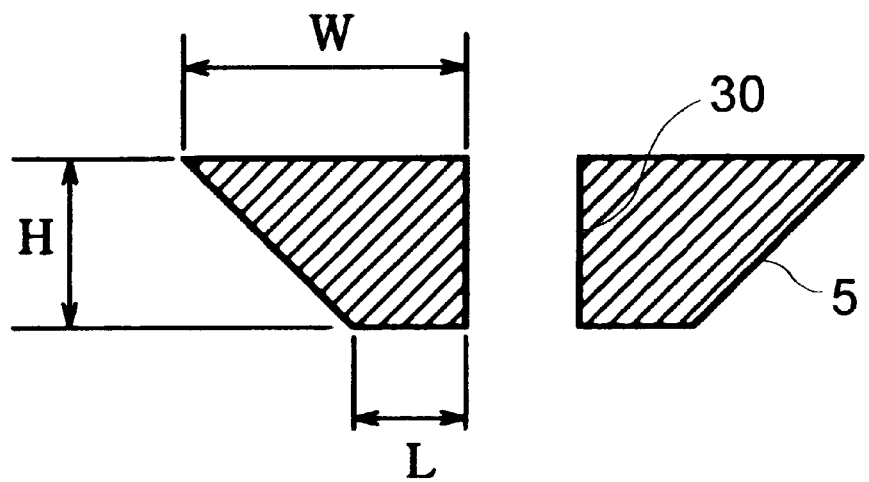
FIG. 8 is a sectional view showing the structure of the protrusion in the basic configuration of FIG. 7.

FIG. 8 is a lateral sectional view showing the protrusion 5 in the apparatus of FIG. 7. In the following, let H be the height of the circular truncated cone of the protrusion 5, W be the distance between the inner face of the first die hole 30 at the center of the circular truncated cone and the outer periphery of the bottom portion (on the first coating die 3 side) of the circular truncated cone, L be the distance between the inner face of the first die hole 30 and the outer periphery of the head portion (on the second coating die 4 side) of the circular truncated cone, and G be the distance of the gap 10 formed between the lower end face of the first coating die 3 and the upper end face of the second coating die 4.

First and second coating resins, which were urethane acrylate type UV-curable resins, were applied as a laminate to the outer periphery of a silica type optical fiber 1 having an outside diameter of 125 μm, so as to produce a coated optical fiber 1a having a first coating layer with an outside diameter of 200 μm and a second coating layer with an outside diameter of 240 μm. Each of the coated resins had yielded a viscosity of 3000 cps at 25° C., which was adjusted to 1000 cps by heating at the time of coating. The diameter $D_1$ of the first die hole on the output side was set to 0.26 mm, whereas the diameter $D_2$ of the second die hole on the input side was set to 0.37 mm. The following table summarizes the results of experiments in which the outside diameter stability of the coated optical fiber 1a was studied while varying the dimensions of the protrusion 5 and the drawing speed of the optical fiber 1 in Comparative Examples.

|  | Dimensions of protrusion (mm) | | | | Stability of coating outside diameter Linear velocity (m/min) | | | |
| --- | --- | --- | --- | --- | --- | --- | --- | --- |
|  | H | W | L | G | 500 | 800 | 1000 | 1200 |
| Example | 0.2 | 0.25 | 0.1 | 1 | ○ | ○ | ○ | ○ |
| Comp. Ex. 1 | — | — | — | 1 | ○ | x | x | x |
| Comp. Ex. 2 | 0.2 | 0.25 | 0 | 1 | ○ | Δ | x | x |
| Comp. Ex. 3 | 0.2 | 1.5 | 0.1 | 1 | ○ | Δ | x | x |

○: The longitudinal outside diameter fluctuation is ±0.5 μm or less.
Δ: The longitudinal outside diameter fluctuation is less than ±1 μm.
x: The longitudinal outside diameter fluctuation is ±1 μm or more.

Figure 3:
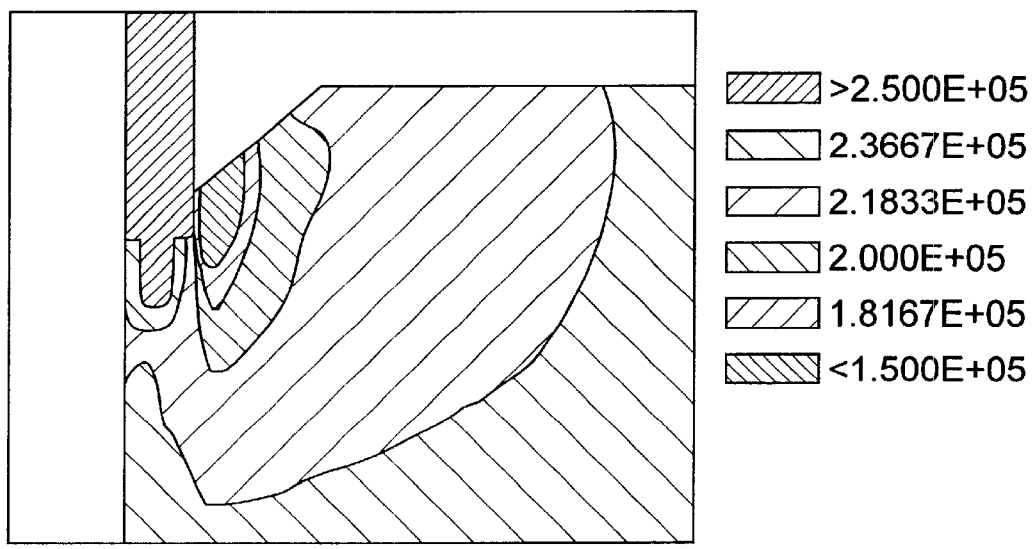
Figure 4:
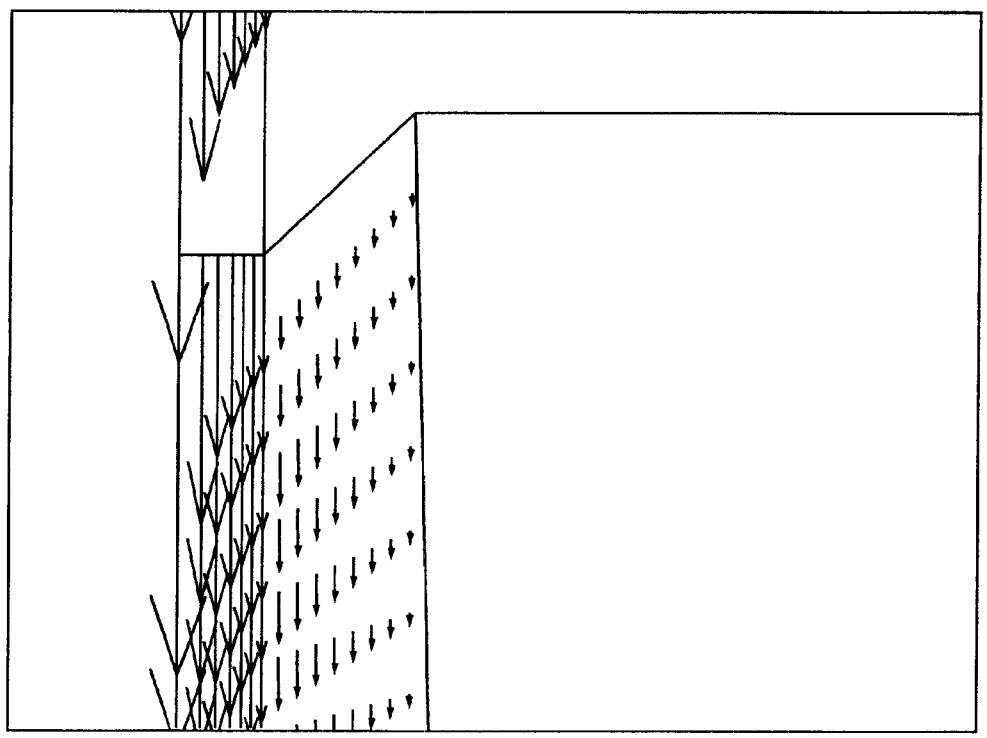
Figure 5A:
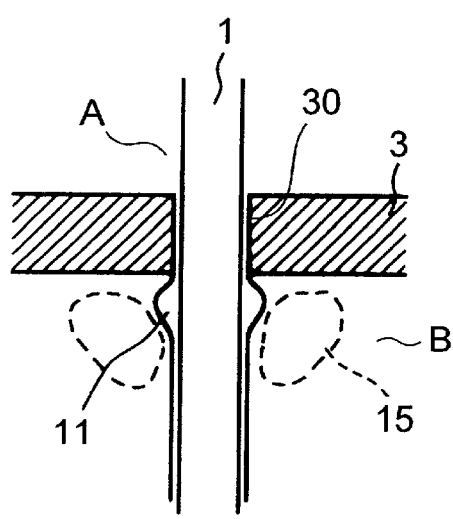
FIGS. 5A to 5D are schematic views showing respective influences of forms of the protrusion disposed near the outlet of the first die hole.
Figure 5B:
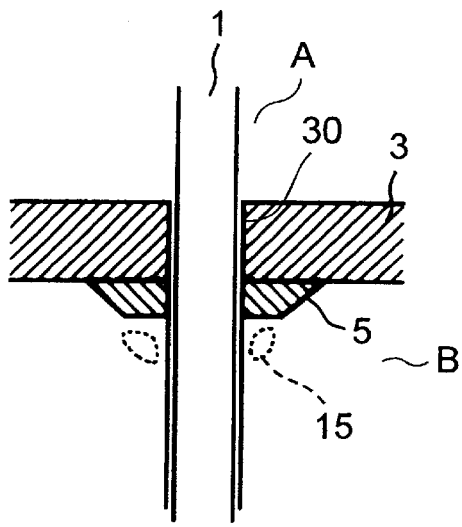
Figure 5C:
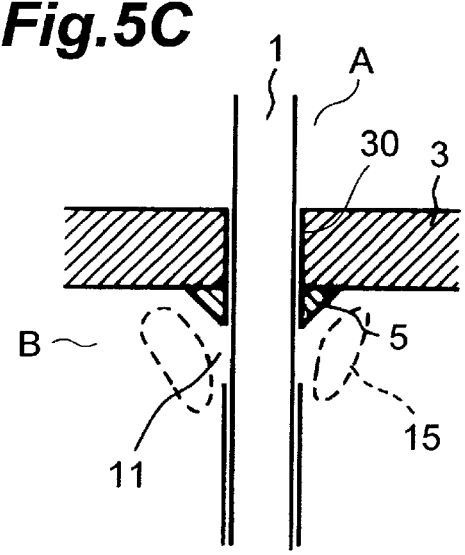
Figure 5D:
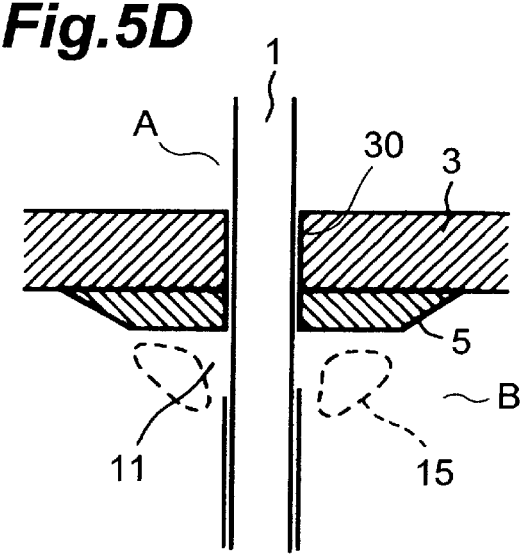

In the case where no protrusion is provided (Comparative Example 1), while no longitudinal fluctuations of coating outside diameter occur at a linear velocity of 500 m/min or less, an outside diameter fluctuation of ±1 μm or more occurs when the linear velocity is higher. In the case provided with a protrusion shaped like a circular cone in which the distance L from the inner face of the hole to the outer periphery of the head portion of a circular truncated cone is set to zero (Comparative Example 2), the coating outside diameter fluctuation begins to occur when the linear velocity reaches 800 m/min, though the outside diameter fluctuation is smaller than that in Comparative Example 1. In the case where the protrusion is formed like a circular truncated cone with the small bottom portion, i.e., the length W on the first coating die 3 side is short (Example), the coating outside diameter fluctuation hardly appears when a linear velocity reaches 1200 m/min. However, it has been found that the coating outside diameter fluctuation occurs again when the bottom portion of the circular truncated cone is too large, i.e., the length W on the first coating die 3 side is too long (Comparative Example 3). Namely, it has also experimentally been confirmed the CFD simulation result as shown in FIGS. 1 and 3 that providing a protrusion 5 shaped like a circular truncated cone at the outlet of the first die hole 30 is effective in regulating the flow of second coating resin and suppressing the coating outside diameter fluctuation.

Upon further detailed studies, it has been found that dimension ranges (mm) of the protrusion which can substantially suppress the outside diameter fluctuation are:

$$0.05 \leq H \leq 0.25$$

$$0.10 \leq W \leq 0.30$$

$$0.05 \leq L \leq 0.1$$

$$0.8 \leq G \leq 1.2$$

and further preferable ranges are:

$$0.05G < H < 0.5G$$

$$(D_2 - D_1)/2 < W < G$$

$$0.01 \leq L < W$$

Some preferred embodiments of the optical fiber coating apparatus in accordance with the present invention will now be explained in detail. They have a basic configuration identical to that of the apparatus shown in FIG. 7.

Figure 9:
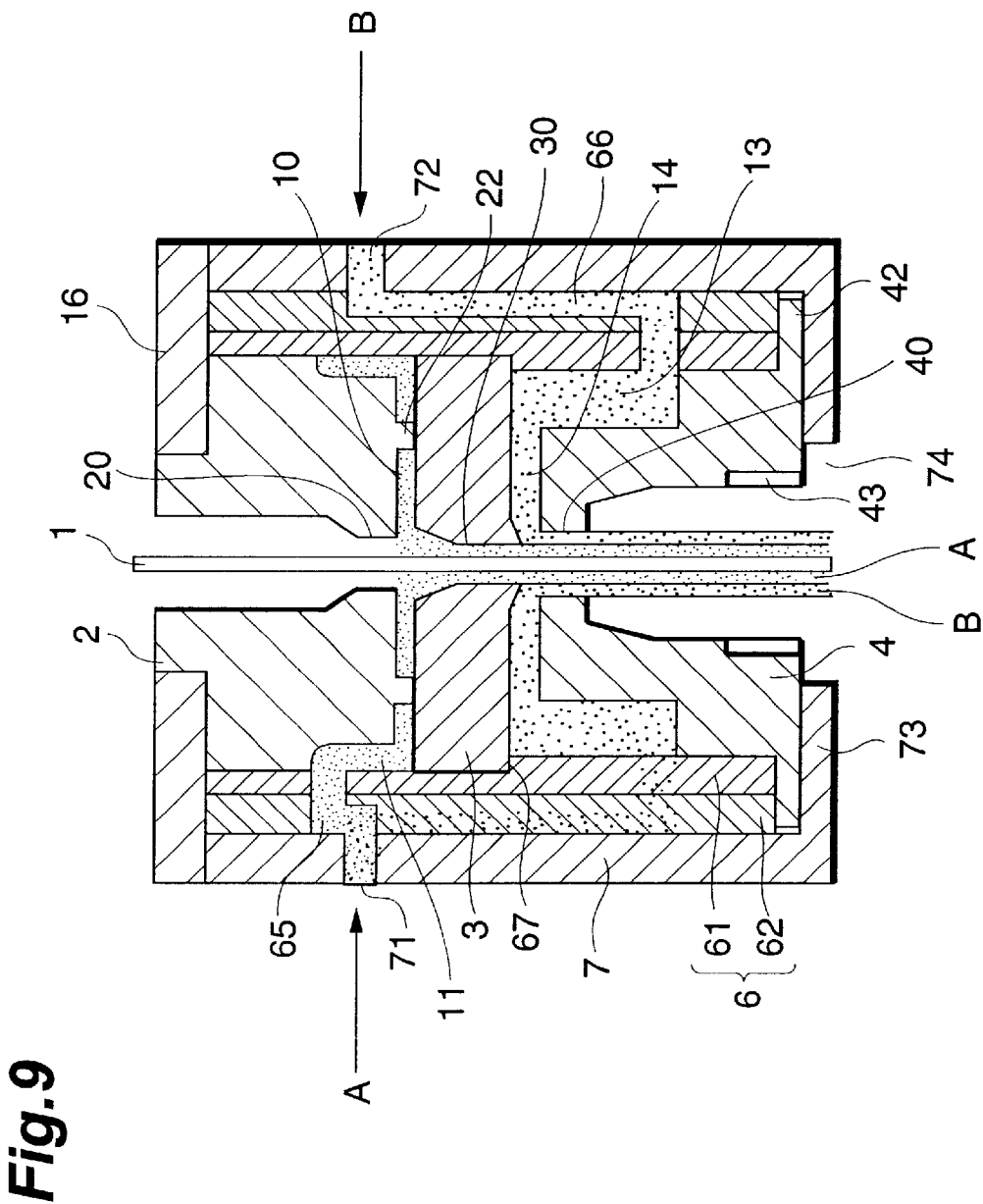
Figure 10:
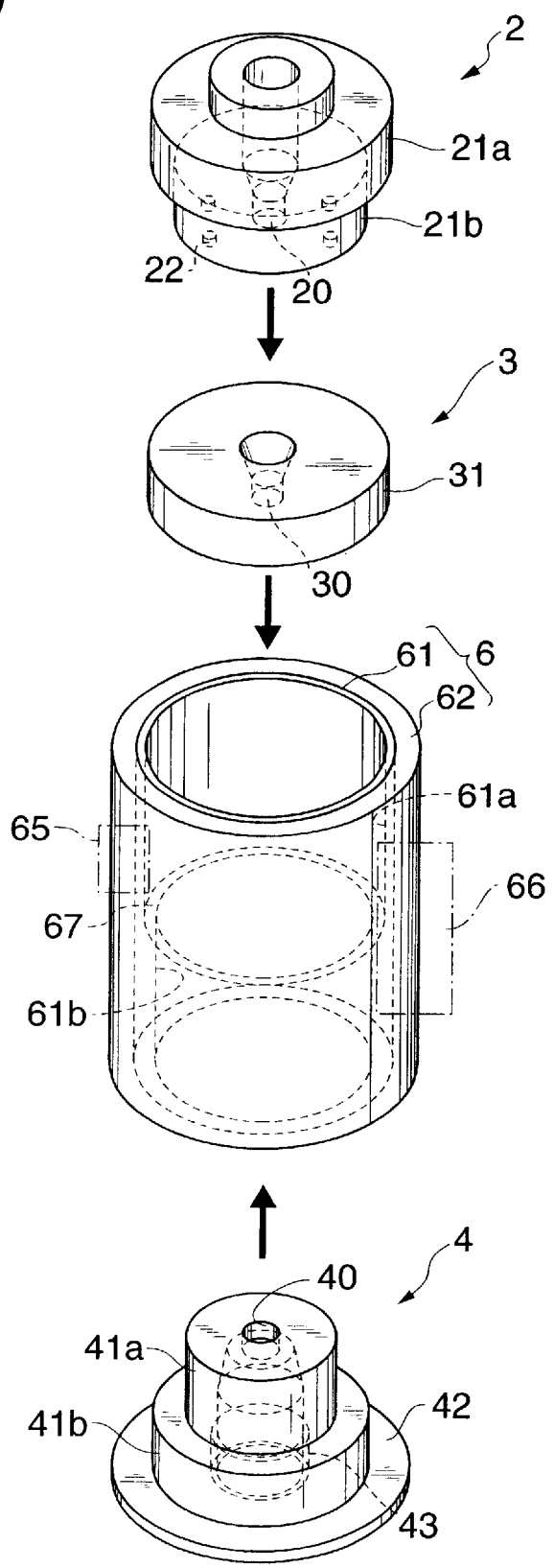
FIG. 10 is a view showing the assembling thereof.
Figure 11:
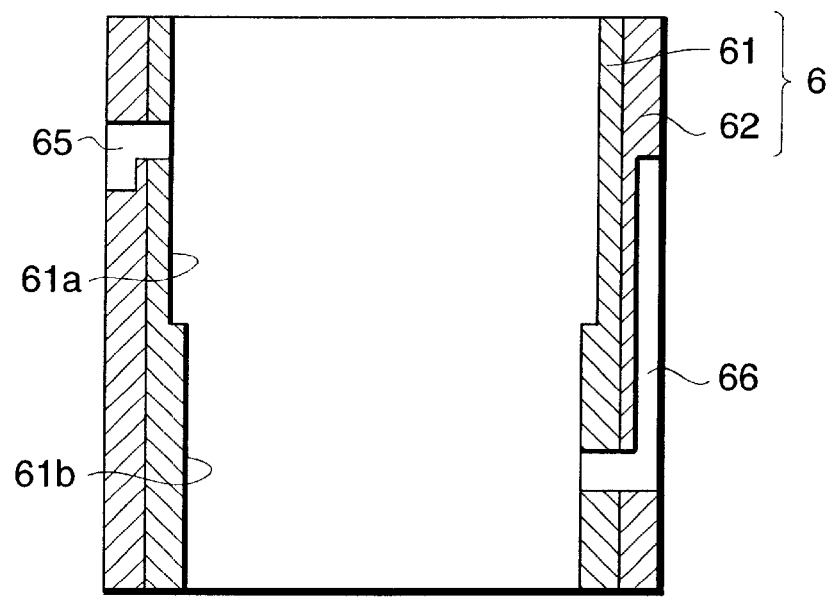
Figure 12:
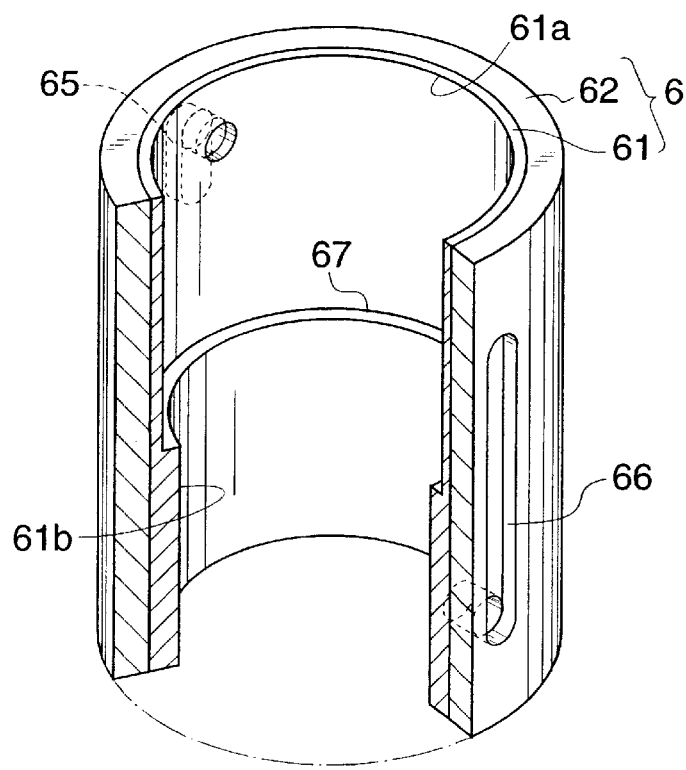
FIG. 12 is a partly cutaway perspective view thereof.
Figure 13:
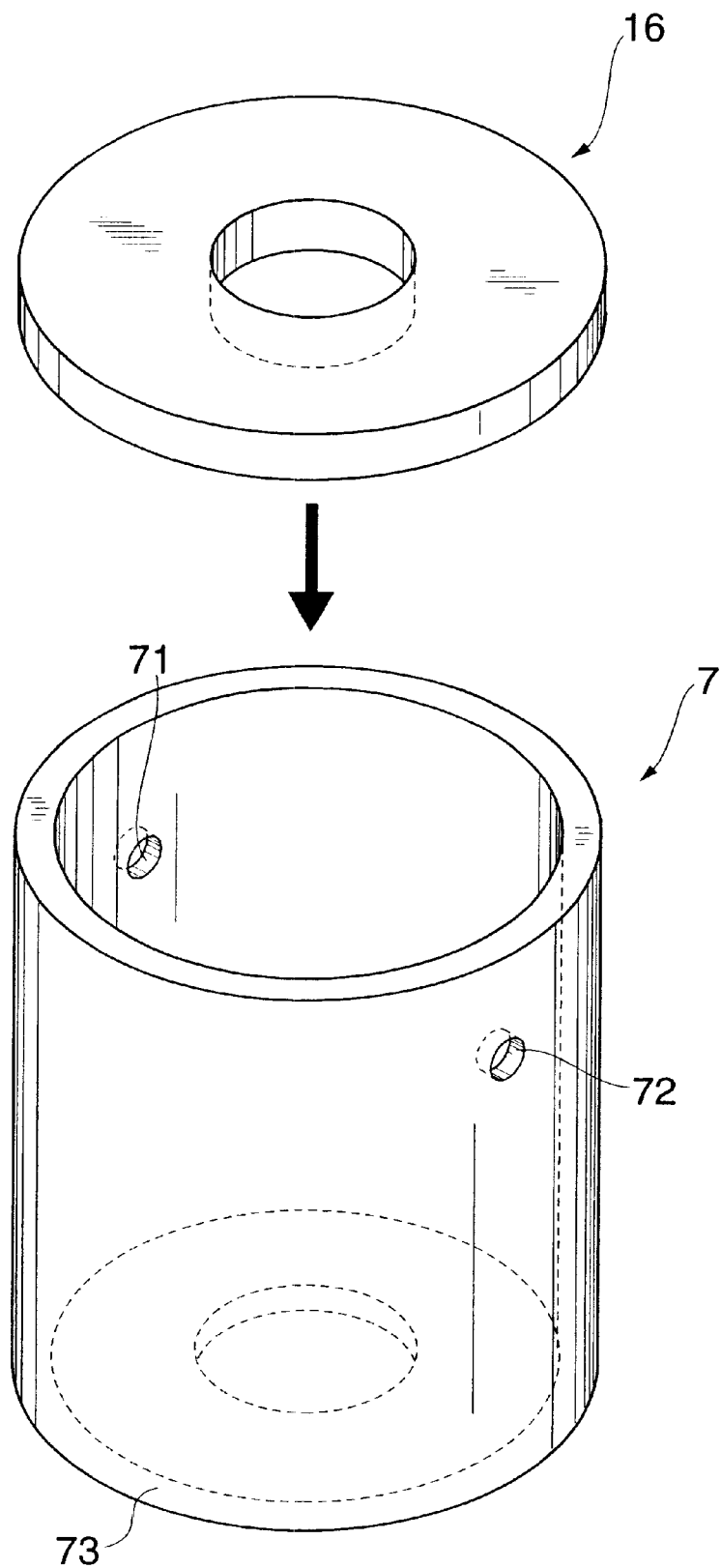
FIG. 13 is a perspective view showing the relationship between a holder 7 and a lid 16 in the apparatus of FIG. 9.

FIG. 9 is a sectional view showing a first embodiment of the optical fiber coating apparatus in accordance with the present invention; FIG. 10 is a view showing the assembling thereof; FIG. 11 is a sectional view of a positioning member 6; FIG. 12 is a partly cutaway perspective view thereof; and FIG. 13 is a perspective view showing the positional relationship between a holder 7 and a lid 16.

This coating apparatus is a coating apparatus in which the outer periphery of an optical fiber 1 is collectively coated with a first coating resin A and a second coating resin B which are applied thereto by a first coating die 3 and a second coating die 4, respectively. The coating apparatus is constituted by a nipple 2, a first coating die 3, and a second coating die 4 which are assembled together. These three members are assembled by a positioning member 6 having a double cylinder structure composed of an inner periphery member 61 and an outer periphery member 62. The positioning member 6 is accommodated in a cylindrical holder 7 and is secured with a lid 16.

Each constituent will now be explained specifically with reference to FIG. 10.

The nipple 2 is a cylindrical body having a nipple hole 20 for axially inserting the optical fiber 1 therethrough, and a lower face formed as a flat lower end face. The lower end face is provided with four projections 22, which form a clearance to become a first passage 10 (see FIG. 9) between this lower end face and the upper end face of the first coating die 3 upon assembling. The outer periphery of the nipple 2 comprises an outer peripheral face 21a adapted to fit an inner peripheral face 61a of the positioning member 6 which will be explained later, and an outer peripheral face 21b having a diameter smaller than that of the former outer peripheral face 21a. The clearance formed between the outer peripheral face 21b and the inner peripheral face 61a of the positioning member 6 becomes an orthogonal flow path 11 connected to the first passage 10.

The first coating die 3 is a cylinder having a first die hole 30 for axially passing the optical fiber 1 and the first coating resin A therethrough, whereas its outer periphery has an outer peripheral face 31 adapted to fit the inner peripheral face 61a of the positioning member 6. The lower end face of the first coating die 3 is provided with a protrusion 5 at the outlet portion of the first die hole 30. The first die hole 30 is constituted, successively from the upper part, a taper portion and a land portion having a smaller inside diameter, whereas the inside diameter of the upper opening of the taper portion is set greater than the inside diameter of the opening at the lowermost portion of the nipple hole 20.

The second coating die 4 is a cylindrical body having a second die hole 40 for passing therethrough the second coating resin B and the optical fiber 1 coated with the first coating resin A, and an upper face formed as a flat upper end face. The clearance formed between the upper end face of the second coating die 4 and the lower end face of the first coating die 3 becomes a second passage 14. The lower face of the second coating die 4 is formed to have a radially extending disk-shaped flange 42. Also, the lower portion of the second die hole 40 is formed to have a tap 43. The outer periphery of the second coating die 4 is formed by an outer peripheral face 41b adapted to fit an inner peripheral face 61b of the positioning member 6, and an outer peripheral face 41a having a diameter smaller than the former outer peripheral face 41b. The clearance formed between the outer peripheral face 41a and the inner peripheral face 61b of the positioning member 6 becomes an orthogonal flow path 13 for guiding the coating resin B to the second passage 14.

The second die hole 40 is solely constituted by a land portion having a short section and a parallel inside diameter, whereas the lower end thereof is connected to a cylindrical opening having a larger inside diameter. The inside diameter of the second die hole 40 is greater than the inside diameter of the lower opening of the first die hole 30. Since the second die hole 40 thus has no taper portion, the fluid pressure of the second coating resin B does not become excessively high in the hole, whereby the first coating resin A existing inside the second coating resin B would not be crushed. Also, the accuracy of processing can be improved in the land portion of the second die hole 40, whereby the applicability of the second coating would not deteriorate in a higher linear velocity region of the optical fiber 1 either.

As shown in FIGS. 11 and 12 as well, the positioning member 6 is constituted by the inner periphery member 61 and the outer periphery member 62, each having a cylindrical form, which are assembled together. The inner face of the inner periphery member 61 has a two-stage structure in which the upper cylindrical inner peripheral face 61a has a diameter greater than that of the lower cylindrical inner peripheral face 61b, thus forming a step 67 at the boundary portion therebetween. The outer peripheral face of the inner periphery member 61 is a smooth cylindrical surface. The outer periphery member 62 is basically shaped like a circular tube with a smooth surface, and partly has grooves which become flow paths 65, 66 for introducing the coating resins A, B as shown in FIGS. 11 and 12. The total number of the flow paths 65, 66 may be one, or two or more may be provided circumferentially.

As shown in FIG. 13 as well, the holder 7 is a cylindrical body provided with a bottom 73 having a hole 74 for passing the coated optical fiber 1 therethrough; whereas its side wall is provided with an introduction port 71, connected to the flow path 65, for introducing the first coating resin A into the first die hole 30, and an introduction port 72, connected to the flow path 66, for introducing the second coating resin B into the second die hole 40.

Here, each of the first coating die 3, second coating die 4, and inner periphery member 61 is made of cemented carbide having a Young's modulus of $5\times10^4$ [kg/mm$^2$] or greater and a coefficient of thermal expansion of $6\times10^{-6}$/° C. or lower, e.g., WC-Co type sintered carbide having a hardness of HRA 90. On the other hand, the outer periphery member 62 is made of alloy tool steel (e.g., SKD) having a Young's modulus of 2 to $3\times10^4$ [kg/mm$^2$] and a coefficient of thermal expansion of $10\times10^{-6}$/° C. The inner periphery member 61 and the outer periphery member 62 are assembled into a two-tier structure by interference fit.

The above-mentioned cemented carbide has a high hardness and is suitable for precision processing, so that it can be finished with a precision of 3 μm or less by grinding. In the present invention, the first coating die 3, the second coating die 4, and the inner periphery member 61 of the positioning member 6 are formed from cemented carbide, and the respective fitting outer peripheral faces of the coating dies 3, 4, and the fitting inner peripheral face of the inner periphery member 61 of the positioning member 6 are further precision-processed, whereby its fitting error can be suppressed to 0 to 3 μm. Therefore, the amount of deviation between the center axis of the hole of the first coating die 3 and the center axis of the hole of the second coating die 4 can be suppressed to 5 μm or less. Also, since cemented carbide has a lower coefficient of thermal expansion, thermal deformations can be suppressed, and coating can stably be continued while keeping the above-mentioned accuracy even against the temperature rise accompanying the resin viscosity control.

If the positioning member 6 is integrally formed from a material such as alloy tool steel, the accuracy of processing will be limited to 5 μm since alloy tool steel is softer than cemented carbide. On the other hand, if it is integrally formed from cemented carbide, complicated forms such as the resin flow paths 65, 66 are hard to process. In this embodiment, the inner periphery member 61 made of cemented carbide is disposed on the inner side, whereas the outer periphery member 62 made of alloy tool steel is disposed on the outer side, so as to form a two-tier structure, thereby enabling fitting with a precise dimensional accuracy and making it possible to form the complicated flow paths 65, 66.

On the other hand, though it is not necessary for the center axis of the nipple hole 20 of the nipple 2 and the center axis of the die hole 30 of the first coating die 3 to align with each other at an accuracy of 6 μm or less, since the features mentioned above can be obtained when cemented carbide is employed, it is preferred that the nipple 2 be constituted by a similar material. Such a configuration makes it possible to easily align the nipple hole 20 of the nipple 2 with the die holes 30, 40 of the first coating die 3 and second coating die 4, thereby allowing a coated optical fiber with less eccentricity in coating to be produced, and enabling coating to stably continue even when temperature rises.

The first die hole 30 and the second die hole 40 are formed by electric discharge machining. The concentricity of the holes is such that, with reference to the inner peripheral face of the positioning member 6 employed as the reference of fitting, the tolerance of concentricity is 10 μm or less (within a circle having a diameter of 10 μm about the center of the diameter employed as the reference surface), i.e., the amount of misalignment is 5 μm or less. Such a degree of machining can be carried out relatively easily. If first and second coating dies having similar amounts of misalignment are selectively combined together with their phases of misalignment directions aligning with each other, then their amounts of misalignment can relatively be made zero. When such a mode is employed, amending operations are hardly necessary in the assembling step, the assembly can easily be disassembled, and the alignment between the center axis of the first die hole 30 and the center axis of the a second die hole 40 can be carried out with a favorable reproducibility.

The assembling of this coating apparatus will now be explained with reference to FIGS. 10 to 13. First, the inner periphery member 61 is inserted inside the outer periphery member 62, and secured thereto by interference fitting. For achieving this, it will be sufficient if, after the outer periphery member 62 is heated to expand, the inner periphery member 61 is inserted therein, and then both of them are cooled, so as to allow the outer periphery member 62 to shrink.

Subsequently, the second coating die 4 is fitted into thus produced positioning member 6 from therebelow, the first coating die 3 is fitted therein until it reaches the step portion 67 from thereabove, and the nipple 2 is fitted thereon. The positioning member 6 mounted with the nipple 2, first coating die 3, and second coating die 4 is fitted into the holder 7 having the bottom portion 73 by interference fitting with a fitting clearance of 20 to 30 μm as shown in FIG. 13, and is attached thereto with unshown positioning pins such that resin flow paths 65, 66 do not shift, whereas the lid 16 is secured thereto from thereabove with bolts or screws. Since the nipple 2, the first coating die 3, and the second coating die 4 are held by the bottom portion 73 of the holder 7 and the lid 16 from the lower and upper sides, even when the coating resins A, B are supplied to the first and second passages 10, 24, respectively, clearances would not widen, notwithstanding the pressures of resins.

The height of the first passage 10 formed between the nipple 2 and the first coating die 3 is defined by the height of the projections 22 disposed at four symmetrical circumferential positions on the lower end face of the nipple 2. The projections 22 may be formed on the upper face of the first coating die 3 as well, and their number of locations is not restricted to four. Instead of the projections 22, the inner peripheral face of the positioning member 6 may be provided with a step so as to form the first passage 10. On the other hand, the height of the second passage 14 formed between the first coating die 3 and the second coating die 4 is defined by the length of the inner peripheral face 61b of the positioning member 6 and the height of the second coating die 4.

It is somewhat difficult to directly insert the first coating die 3 and the second coating die 4 into the positioning member 6 in a fitting fashion by manual labor since the fitting clearance therebetween is 0 to 3 $\mu$m. However, since the coefficient of thermal expansion of cemented carbide employed in the positioning member 6 is $5.1 \times 10^{-6}/°$ C., in the case where the fitting reference surface has a diameter of 20 mm, for example, if the positioning member 6 is heated to about 50° C. by a hot plate or the like, then the fitting clearance increases by about 3 $\mu$m, thus making the fitting relatively easy. When the fitting inner peripheral face of the positioning member 6 is lapped to about 0.8 S, it also prevents bite from occurring, thus facilitating the fitting. Also, a hand press may be used for pushing the dies 3, 4 into the positioning member 6. Conversely, though there have been cases where it becomes difficult to remove the first coating die 3 and the second coating die 4 from the positioning member 6 by manual labor alone, since the bottom portion of the second coating die 4 is provided with the tap 43, they can easily be taken out by use of a jig having a jack structure. When the second coating die 4 is removed, then it becomes easier to take out the first coating die 3 with an appropriate jig being pressed against the bottom portion thereof.

On the other hand, after the nipple 2, the first coating die 3, and the second coating die 4 are fitted into the positioning member 6, and the resulting assembly is secured within the holder 7, the amount of misalignment between the center axis of the first coating die 3 and the center axis of the second coating die 4 is measured by use of a tool microscope or measuring microscope. Since the first coating die 3 has a bore diameter smaller than that of the second coating die 4 due to the structure of the coating resin layers, the hole of the second coating die 4 is brought into focus, and the coordinates of the center of hole are determined by circular approximation. Subsequently, the hole of the first coating die 3 is brought into focus, and the coordinates of the center of the hole are similarly determined. The distance obtained from these center coordinates is the amount of misalignment. The concentricity of the nipple 2 and the first coating die 3 is measured by a similar method.

The first coating resin A introduced from the introduction port 71 passes through the flow path 65 formed between the inner surface of the holder 7 and the outer surface of the positioning member 6, travels through the first passage 10 formed between the lower end face of the nipple 2 and the upper end face of the first coating die 3, and then is introduced into the die hole 30 of the first coating die 3. On the other hand, the second coating resin B introduced from the introduction port 72 passes through the flow path 66 formed between the inner surface of the holder 7 and the outer surface of the positioning member 6 and between the inner surface of the positioning member 6 and the outer surface of the second coating die 4, travels through the second passage 14 formed between the lower end face of the first coating die 3 and the upper end face of the second coating die 4, and then is introduced into the die hole 40 of the second coating die 4.

The optical fiber 1 is inserted from the nipple hole 20 and passes through the injected first coating resin A while traveling through the first die hole 30 of the first coating die 3. While traveling through the second die hole 40 of the second coating die 4, the optical fiber 1 in the state coated with the first coating resin A passes through the injected second coating resin B. Then, the optical fiber 1 in the state coated with the second coating resin B is drawn to the outside, whereby the outer periphery of the optical fiber 1 with a double coating is fabricated.

In this apparatus, as in the above-mentioned basic configuration, the protrusion 5 is effective in regulating the flow of second coating resin, thus being able to suppress the disorder of flows at the interface between the first and second coating resins, thereby making it possible to obtain a double-coated optical fiber with no outside diameter fluctuation even in a higher linear velocity region.

Figure 14:
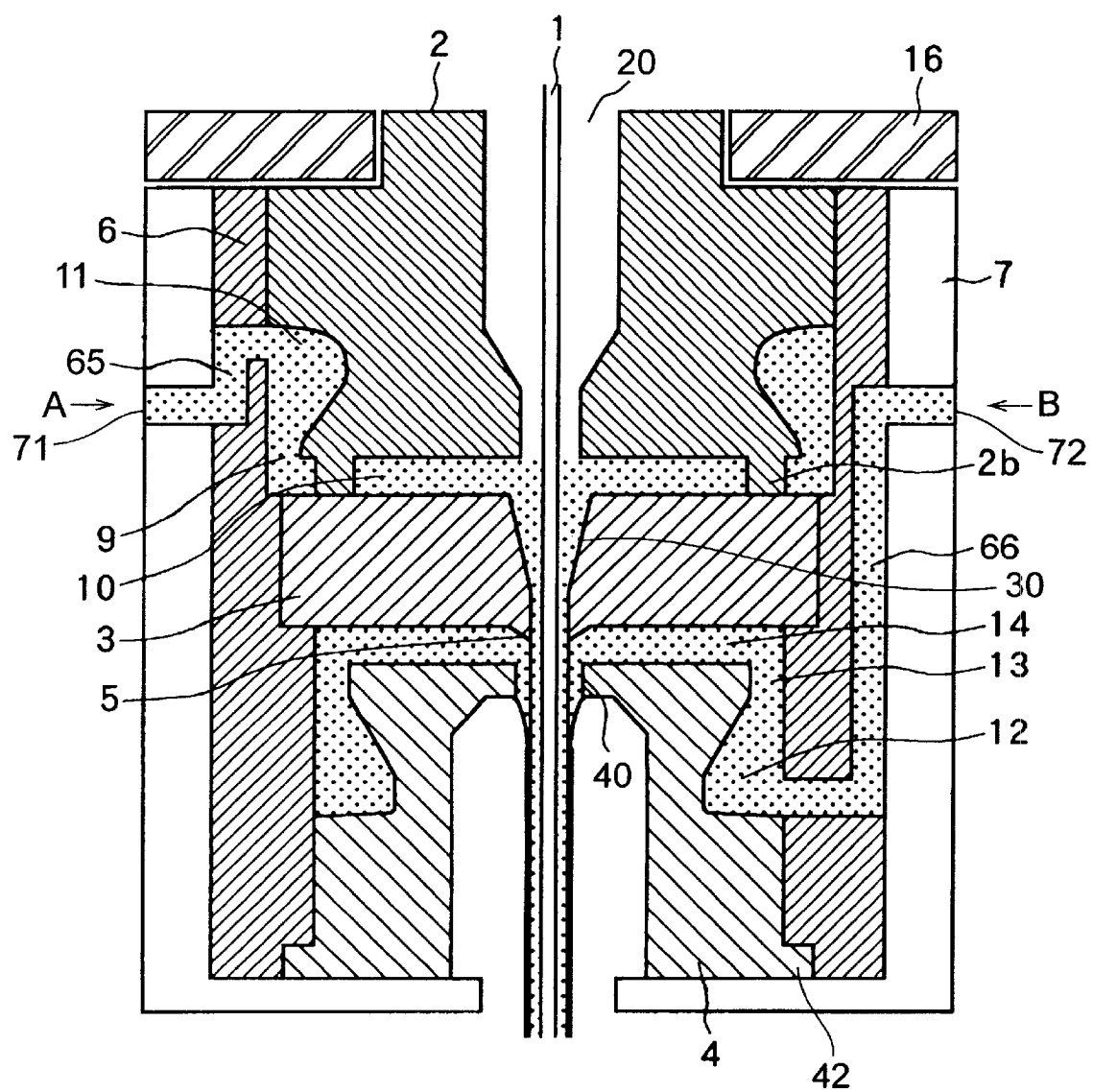
FIGS. 14 and 15 are sectional views showing configurations of other embodiments of the coating apparatus in accordance with the present invention, respectively.

FIG. 14 is a sectional view of a second embodiment of the optical fiber coating apparatus in accordance with the present invention. This apparatus has a basic configuration identical to that of the first embodiment shown in FIG. 9 except that the positioning member 6 has an integral configuration.

The differences from the first embodiment shown in FIG. 9 will now be explained. An intermediate portion of the outer peripheral face of the nipple 2 is provided with a circumferential groove, which is deeper on the upper side and tapers downward, so as to form a first reservoir 8 within the flow path. The outside diameter of the nipple 2 is made slightly smaller than the inside diameter of the positioning member 6 at the position corresponding to the lower side of the first reservoir 8, whereby a first draw portion 9 is formed along the boundary with respect to the inner peripheral face of the positioning member 6. On the upper end side, the outside diameter of the second coating die 4 is made slightly smaller than the inside diameter of the positioning member 6, whereby a second draw portion 13 is formed along the boundary with respect to the inner peripheral face of the positioning member 6. Also, an intermediate portion of the second coating die 4 has a circumferential groove adjacent the lower side of the second draw portion 13, which is made shallower in the upper part and gradually becomes deeper downward, whereby a second reservoir 12 is formed.

The positioning member 6 has a thin, substantially cylindrical form, whose inside diameter is changed according to axial positions, so as to form steps in the inner peripheral face thereof. Using these steps, the nipple 2, the first coating die 3, and the second coating die 4 are secured at predetermined positions within the positioning member 6.

In this second embodiment, the first coating resin A is supplied under pressure from the first coating resin introduction port 71 to the first reservoir 8 of the nipple 2 by way of the outer peripheral groove 65 of the positioning member 6. The first coating resin A within the first reservoir 8 is further fed by way of the first draw portion 9 toward the axial center of the apparatus through the first passage 10, so as to reach a portion between the outlet of the nipple hole 20 and the inlet of the first die hole 30.

On the other hand, the second coating resin B is supplied under pressure from the second coating resin introduction port 72 to the second reservoir 12 of the second coating die 4 by way of the outer peripheral groove 66 of the positioning member 6. The second coating resin B within the second reservoir 12 is fed by way of the second draw portion 13 toward the axial center of the apparatus through the second passage 14, so as to reach a portion between the outlet of the first die hole 30 and the inlet of the second die hole 40.

As in the first embodiment, the optical fiber 1 is inserted from the nipple hole 20 and passes through the injected first coating resin A while traveling through the first die hole 30. Subsequently, while traveling through the second die hole 40 of the second coating die 4, the optical fiber 1 in the state coated with the first coating resin A passes through the injected second coating resin B. Then, the optical fiber 1 in the state coated with the second coating resin B is drawn to the outside, whereby the outer periphery of the optical fiber 1 with a double coating is fabricated.

Here, since the first coating resin A is regulated by the first reservoir 8 and the first draw portion 9 so as to form a uniform flow throughout the periphery before being guided to the first passage 10, the first coating resin A within the first passage 10 flows orthogonal to the optical fiber 1. As a result, the optical fiber 1 can be provided with a uniform thickness of the first coating, and the first coating resin A can be restrained from recirculating.

Also, since the second coating resin B is regulated by the second reservoir 12 and the second draw portion 13 so as to form a uniform flow throughout the periphery before being guided to the second passage 14, the second coating resin B within the second passage 14 flows orthogonal to the optical fiber 1 whose outer peripheral face is coated with the first coating resin A. Consequently, as in the case of the first coating resin A, a uniform thickness of the second coating can be applied thereto. Also in this apparatus, the protrusion 5 is effective in regulating the flow of second coating resin, thus being able to suppress the disorder of flows at the interface between the first and second coating resins, thereby making it possible to obtain a double-coated optical fiber with no outside diameter fluctuation even in a higher linear velocity region.

Figure 15:
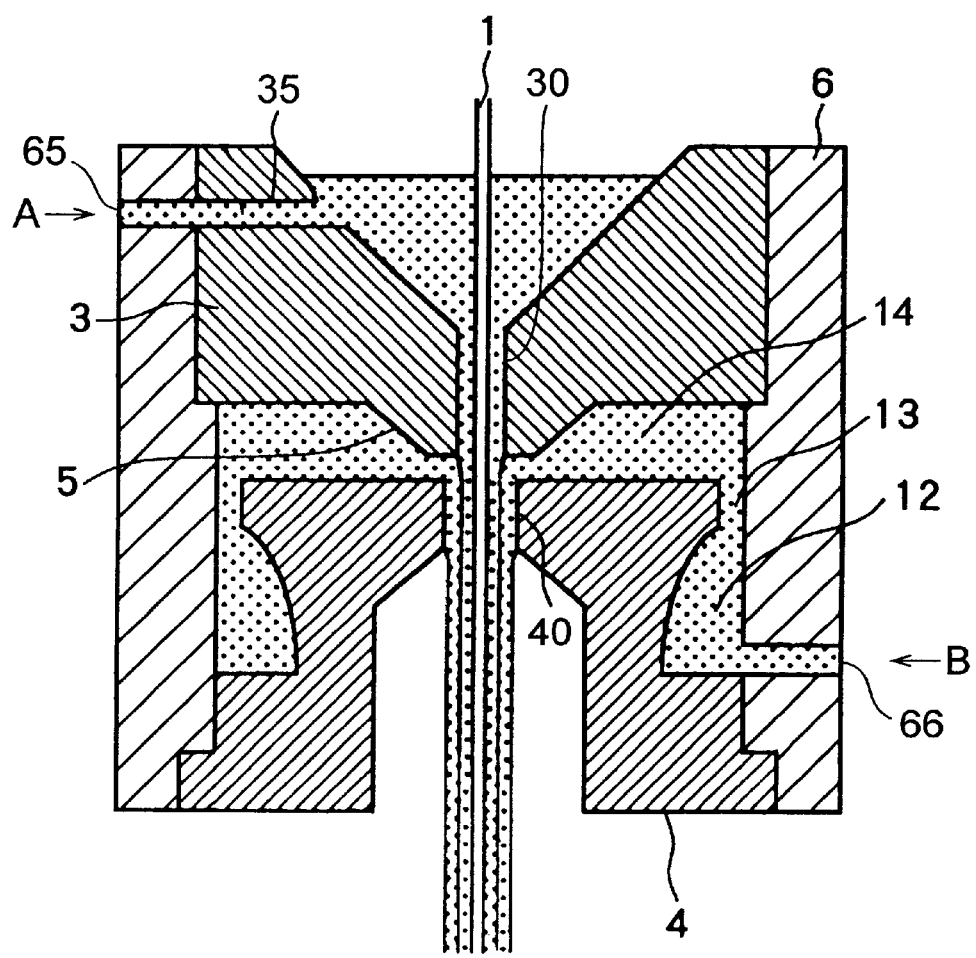
Figure 16:
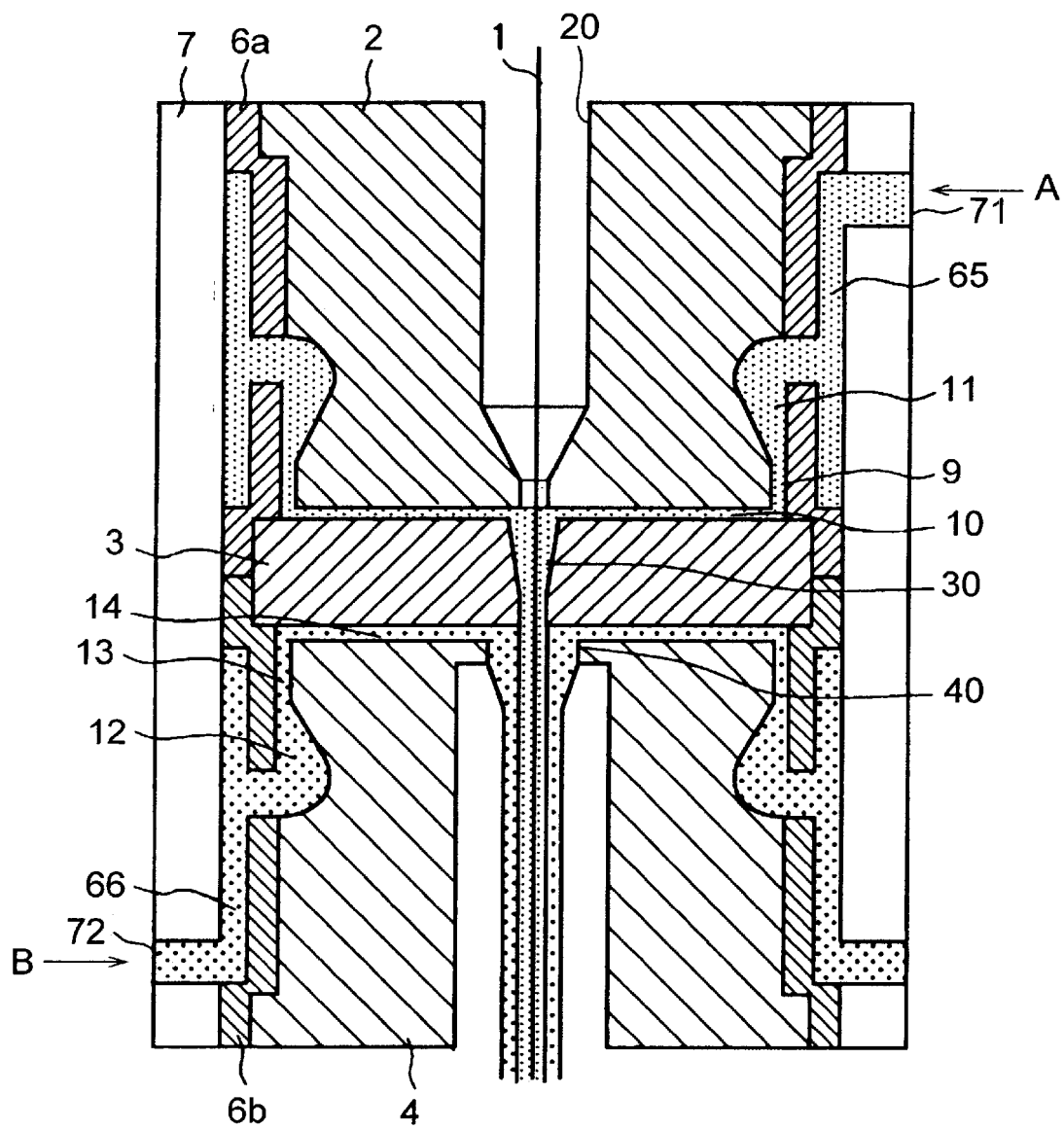
FIG. 16 is a sectional view showing a configuration of the conventional coating apparatus.

FIG. 15 is a view showing a third embodiment of the coating apparatus in accordance with the present invention. This apparatus is constituted by a first coating die 3, a second coating die 4, and a positioning member 6 combining these dies together. This coating apparatus has a basic configuration identical to that of the apparatus shown in FIG. 7.

While passing through the first die hole 30 of the first coating die 3, the optical fiber 1 comes into contact with and is coated with the injected first coating resin A. Subsequently, while passing through the second hole 40 of the second coating die 4 after coming out of the first die hole 30, the optical fiber 1 covered with the first coating resin A further comes into contact with and is coated with the second coating resin B, whereby the optical fiber 1 downwardly drawn out of the second die hole 40 with a double coating is fabricated.

The form of each member will now be explained. The first coating die 3 has substantially a cylindrical form having a resin introduction hole 35 in its upper part, the first die hole 30 in the center part, and a flat lower end face orthogonal to the first die hole 30. The gap between this lower end face and the upper end face of the second coating die 4, which will be explained later, forms a second passage 14. Further, this lower end face is provided with a protrusion 5 at the outlet of the first die hole 30. The first die hole 30 is constituted by, successively from the upper part, a taper portion and a parallel land portion having a smaller inside diameter.

The second coating die 4 has a thick, substantially cylindrical form provided with the second die hole 40 at the center. Its upper end face is formed as a circular flat surface orthogonal to the first die hole 30 and the second die hole 40.

Also, the outside diameter of the second coating die 4 on the upper end side thereof is made slightly smaller than the inside diameter of the positioning member 6, which will be explained later, whereby a draw portion 13 is formed along the boundary with respect to the inner peripheral face of the positioning member 6. Further, an intermediate portion of the second coating die 4 corresponding to the lower side of the draw portion 13 has a circumferential groove, which is made shallower on the upper side and gradually becomes deeper downward, so as to function as a reservoir 12.

The second die hole 40 has a parallel land portion alone having a short section, and is connected to a cylindrical opening having a greater inside diameter thereunder. The inside diameter of the land portion opening is greater than that of the opening on the lower side of the first die hole 30. Since the second die hole 40 thus has no taper portion, the fluid pressure of the second coating resin B does not become excessively high in the hole, whereby the first coating resin A existing inside the second coating resin B would not be crushed. Also, the accuracy of processing can be improved in the parallel land of the second die hole 40, whereby the applicability of the second coating would not deteriorate in a higher linear velocity region of the optical fiber 1 either.

The positioning member 6 is substantially shaped like a cylinder, having a flow path 65, disposed near the upper end portion, for introducing the first coating resin, and a flow path 66, disposed near the lower end portion, for introducing the second coating resin. For securing the first coating die 3 and the second coating die 4 to predetermined positions, the inside diameter of the positioning member 6 is changed according to axial positions, so as to form steps in the inner peripheral face thereof.

The method of assembling this apparatus will now be explained. First, the second coating die 3 is fitted into the positioning member 6 from therebelow, and is positioned with the steps provided in their respective bottom portions. Subsequently, the first coating die 3 is fitted into the positioning member 6 from thereabove, and is positioned with the step provided in the intermediate portion of the latter. As a result, a gap which will be explained later is formed between the lower end face of the first coating die 3 and the upper end face of the second coating die 4. Finally, the positioning member 6 is inserted into an unshown holder, and an unshown lid is attached thereon, so as to secure each member. The holder and the lid similar to those shown in FIG. 13 can be used.

The respective flow paths of the first and second coating resins A, B will now be explained. The first coating resin A is supplied from the flow path 65 to the first die hole 30 of the first coating resin die 3 by way of the resin introduction hole 35. On the other hand, the second coating resin B is supplied under pressure from the flow path 66 to the reservoir 12 of the second coating die 4. The second coating resin within the second reservoir 12 further travels through the draw portion 13 and then radially flows through the second passage 10 from its outer periphery toward the center, thereby reaching a portion between the outlet of the first die hole 30 and the inlet of the second die hole 40. In this embodiment, since a single optical fiber coating apparatus is constituted by combination of individual constituent members, processing of each constituent member for forming the flow paths of the first and second resins A, B can be made easier.

Also in this apparatus, the protrusion 5 is effective in regulating the flow of second coating resin, thus being able to suppress the disorder of flows at the interface between the first and second coating resins, thereby making it possible to obtain a double-coated optical fiber with no outside diameter fluctuation even in a higher linear velocity region.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber coating apparatus for applying first and second coating resins as a laminate to the outer periphery of an optical fiber, said apparatus comprising:

a first coating die having a first die hole through which said optical fiber is inserted and a basically disk-shaped lower end face with a protrusion projecting in the passing direction of said optical fiber and formed around said first die hole, said first die hole and the outer periphery of said optical fiber therein forming a space therebetween into which said first coating resin is injected; and a second coating die having a second die hole which is concentric with said first die hole and through which said optical fiber passed through said first die hole is inserted and an upper end face comprising a circular plate opposing the lower end face of said first coating die so as to form a gap through which said second coating resin is injected into a space formed between said second die hole and the outer periphery of said optical fiber therein;

said protrusion being formed so as to reduce an annular lower-pressure region formed around said optical fiber in a flow of said second coating resin within said gap; and said protrusion is shaped like a circular truncated cone, wherein said apparatus satisfies:

$$0.05G < H < 0.5G$$

$$(D_2 - D_1)/2 < W < G$$

$$0.01 \text{ mm} \leq L < W$$

where H is the height of the circular truncated cone of said protrusion, W is the distance between the outer periphery of the bottom portion of said circular truncated cone and the inner peripheral face of said first die hole, L is the distance between the outer periphery of a head portion of said circular truncated cone and the inner peripheral face of said first die hole, $D_1$ is the inner peripheral face diameter of said first die hole on the outlet side of said optical fiber, $D_2$ is the inner peripheral face diameter of said second die hole on the inlet side of said optical fiber, and G is the distance of the gap between said first and second coating dies.

2. An optical fiber coating apparatus according to claim 1, wherein said protrusion is shaped like a circular truncated cone.

3. An optical fiber coating apparatus according to claim 1, further comprising:

a positioning member having a cylindrical inner peripheral face adapted to fit the respective outer peripheral faces of said first and second coating dies, each of said first and second coating dies and the inner peripheral face of said positioning member being comprised of a material having a Young's modulus of $5 \times 10^4$ kg/mm$^2$ or greater and a coefficient of thermal expansion of $6 \times 10^{-6}/°$ C. or lower.

4. An optical fiber coating apparatus according to claim 3, further wherein said positioning member is comprised of an inner periphery member made of cemented carbide forming said inner peripheral face and an outer periphery member made of alloy tool steel having a lower Young's modulus and a higher coefficient of thermal expansion than said inner periphery member which are fastened and secured together by interference fitting.

5. An optical fiber coating apparatus according to claim 3, further wherein a bottom face of said first or second die has a tap used for attachment/detachment with respect to said positioning member.

6. An optical fiber coating apparatus according to claim 3, further comprising a nipple made of a material having a Young's modulus, a coefficient of thermal expansion, and a hardness which are substantially identical to those of the inner peripheral face of said positioning member, said nipple being adapted to fit the inner peripheral face of said positioning member such that a nipple hole for guiding the inserted optical fiber to said first die hole is arranged concentric with said first die hole.

* * * * *